Patented Nov. 11, 1924.

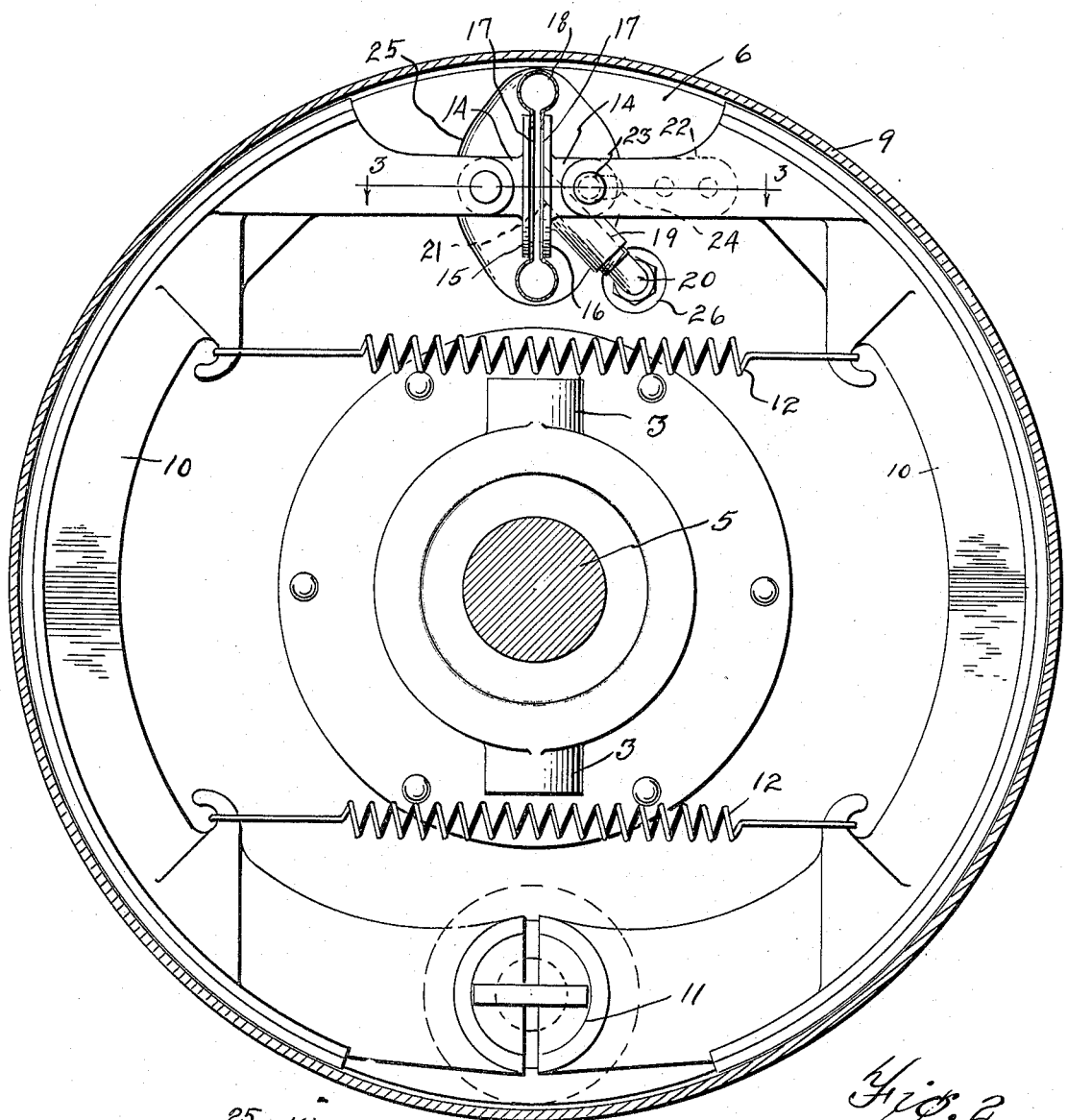
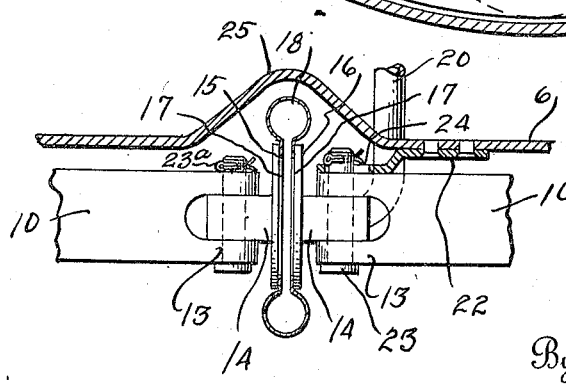
Fig. 2
Fig. 3
Inventor
Edwin R. Evans

1,515,018

UNITED STATES PATENT OFFICE.

EDWIN R. EVANS, OF DETROIT, MICHIGAN.

FLUID-OPERATED BRAKE.

Application filed February 26, 1923. Serial No. 621,409.

*To all whom it may concern:*

Be it known that I, EDWIN R. EVANS, a citizen of the United States of America, residing at Detroit, in the county of Wayne and State of Michigan, have invented certain new and useful Improvements in Fluid-Operated Brakes, of which the following is a specification, reference being had therein to the accompanying drawings.

This invention relates to vehicle brakes and relates more particularly to fluid operated brakes for motor vehicles.

The invention consists in an improved means for applying a controlling fluid pressure to a vehicle wheel brake.

In the drawings:—

Figure 2 is a sectional view of the same, on line 2—2 of Figure 1;

Figure 3 is a section on line 3—3 of Figure 2.

Figure 1:
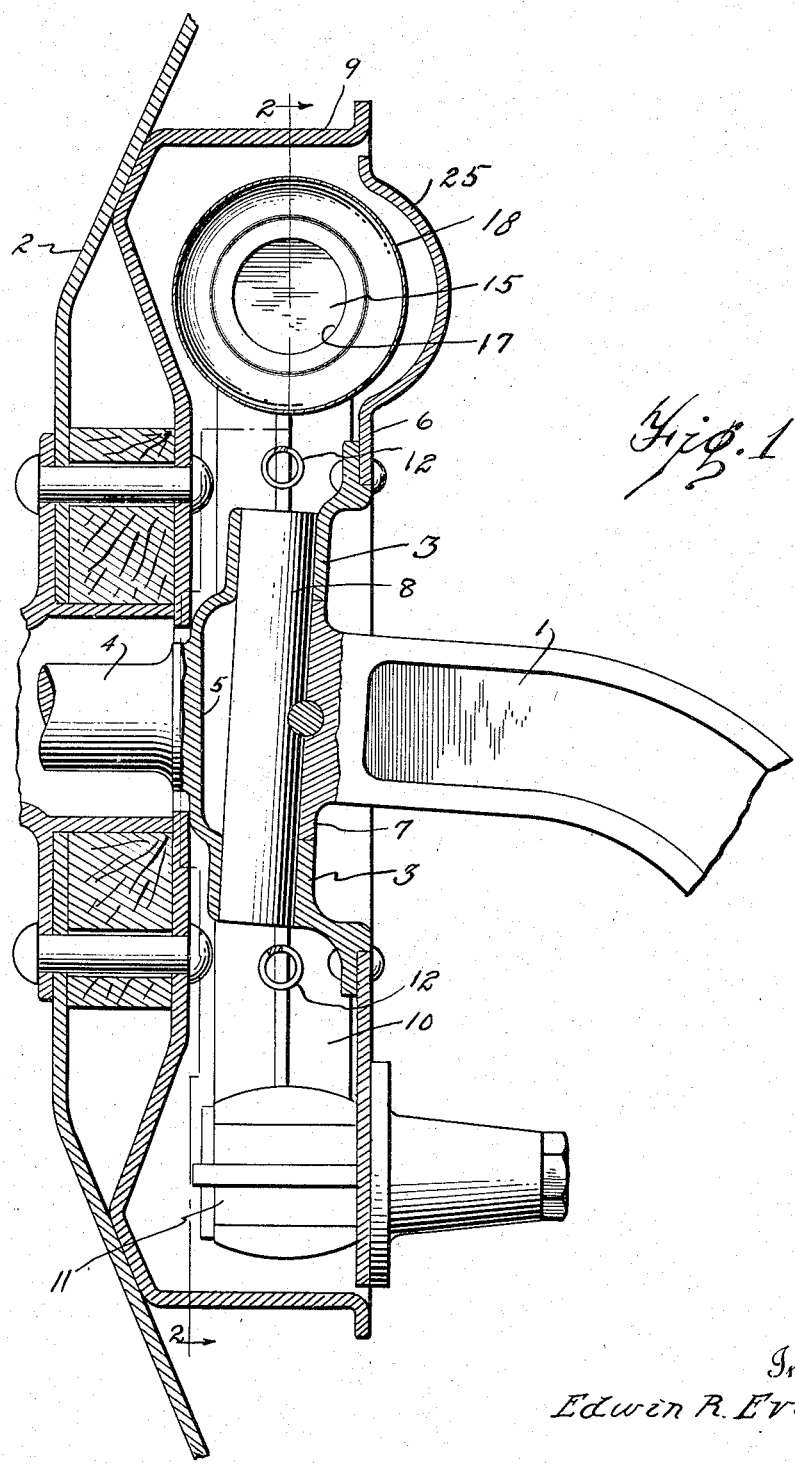
Figure 1 is a vertical sectional view of the improved brake mechanism as applied to a disk wheel, the central portion only of the wheel being shown.

In these views, the reference character 1 designates a vehicle axle and 2 one of the wheels swiveled upon said axle for steering movement. The swiveled element comprises a pair of bearings 3 integrally connected, a spindle 4 rigidly projecting from the element 5 connecting said bearings and the plate 6 bolted or otherwise rigidly secured to said bearings. 7 is a bearing integrally formed upon the axle 1 and engaging between the bearings 3. 8 is a substantially vertical pin connecting the bearings 3 and 7 and establishing the swivel axis for steering movement of the wheel. A brake drum 9 is rigidly carried by the wheel, and is interiorly engageable by a pair of complementary semi-circular brake shoes 10, the lower ends of which engage a common pivot element 11 carried by the plate 6 while between the upper ends of said shoes a provision is made for spreading the shoes into engagement with the drum 9 in opposition to a pair of coil springs 12, which connect the shoes and urge them toward each other. As so far described, the construction is not new, being more fully disclosed and shown in applicant's Patent Number 1,463,159, issued July 31, 1923.

The present invention consists in a diaphragm means for applying a controlling fluid pressure to the brake shoes 10. Thus, the opposed upper ends of said brake shoes are forked, as indicated at 13, to embrace lugs 14 formed respectively upon disks 15 and 16 which permanently close opposed circular openings 17 in a sheet metal annular chamber 18. The portions of said chamber marginal to the openings 17 are relatively close adjacent, the chamber expanding outwardly of said portions and having preferably a circular cross section. The disks 15 and 16 may be secured to the chamber 18 by welding or other suitable means. The disk 16 functions as a fitting to connect the chamber 18 with a source of fluid pressure. Thus, said fitting has the integral nipple 19 for engagement with a pipe 20 leading to any suitable source of fluid pressure (not shown) and from said nipple a passage 21 is extended into communication with the chamber 18, said passage opening centrally in the inner face of the disk 16. 22 is a bracket secured to the plate 6 and engaged by the pin 23 which connects the disk 16 to the corresponding brake shoe to exercise a restraint upon said shoe against lateral movement, that is to say, transverse to the brake drum. A cotter pin or the like 23$^a$ is carried by each pivot pin 23 preventing endwise disengagement of the latter from the corresponding bracket 22. The opening 24 in said bracket engaged by said pin is elongated slightly parallel to the axis of the diaphragm chamber 18 to permit the pin to have the necessary movement in the direction of said axis for applying and releasing the corresponding brake shoe. Preferably the plate 6 is dished away from the brake drum 9 sufficiently to accommodate the diaphragm chamber 18, as is indicated at 25. 26 indicates an opening in the plate 6 through which the fluid supply pipe 20 passes.

From the preceding description, the operation of the described invention will be evident. When it is desired to apply the brakes, fluid under pressure will be introduced through the pipe 20 into the diaphragm chamber 18 expanding the same so as to increasingly space the disks 15 and 16. Since said disks are respectively secured to the brake shoes, the latter are thus frictionally engaged with the brake drum, swinging about their common pivot 11. When the fluid pressure within said diaphragm chamber is relieved, the springs 12 will retract the brake shoes toward each other and will also contract the diaphragm chamber 18 to its normal dimensions.

What I claim as my invention is:—

1. In a brake mechanism, the combination with a pair of complementary brake shoes, of an expansible chamber between said shoes having opposed apertured walls, closures for the apertures in said walls pivotally connected to the respective shoes for actuating said shoes apart through expansion of said chamber, and means for admitting and withdrawing the fluid to and from said chamber.

2. In a brake mechanism, the combination with a brake drum and a brake shoe interiorly engageable with said drum, of an expansible chamber pivotally connected to said shoe within the drum for actuating the shoe, a pivot element establishing the connection, means engaging said pivot element to restrain the expansible chamber from movement parallel to the axis of the drum, and means for admitting and withdrawing a fluid to and from said chamber.

3. In a brake mechanism, the combination with a brake drum, and a pair of complementary brake shoes interiorly engageable with said drum, of a diaphragm chamber interposed between adjoining extremities of said brake shoes and solely carried by said shoes, and members carried by said diaphragm chamber at opposite sides thereof pivotally engaging said brake shoes, whereby said chamber forms the floating actuating connection between said shoes.

4. In a brake mechanism, the combination with a front vehicle wheel, and means swivelly mounting said wheel to turn about a substantially vertical axis, of a brake drum carried by said wheel, a brake shoe interiorly engageable with said drum, and a diaphragm chamber within the drum and centered substantially in the extended swivel axis of the wheel, the axis of said diaphragm chamber being transverse to said swivel axis, and means connecting said shoe and chamber adapting the shoe to be engaged with the drum through expansion of said chamber.

5. In a brake mechanism, the combination with a brake drum, and a pair of complementary brake shoes interiorly engageable with said drum, of a diaphragm chamber interposed between adjoining extremities of said brake shoes, an actuating connection between said diaphragm chamber and shoes, means for admitting and withdrawing fluid to and from said chamber, said chamber being free to float with said shoes in the rotational plane of the drum, and means restraining said chamber and the engaged extremities of the shoes from movement transverse to said rotational plane.

In testimony whereof I affix my signature.

EDWIN R. EVANS.